June 12, 1923.
L. E. HART
LOCKING PLIERS
Filed Aug. 25, 1922
1,458,292
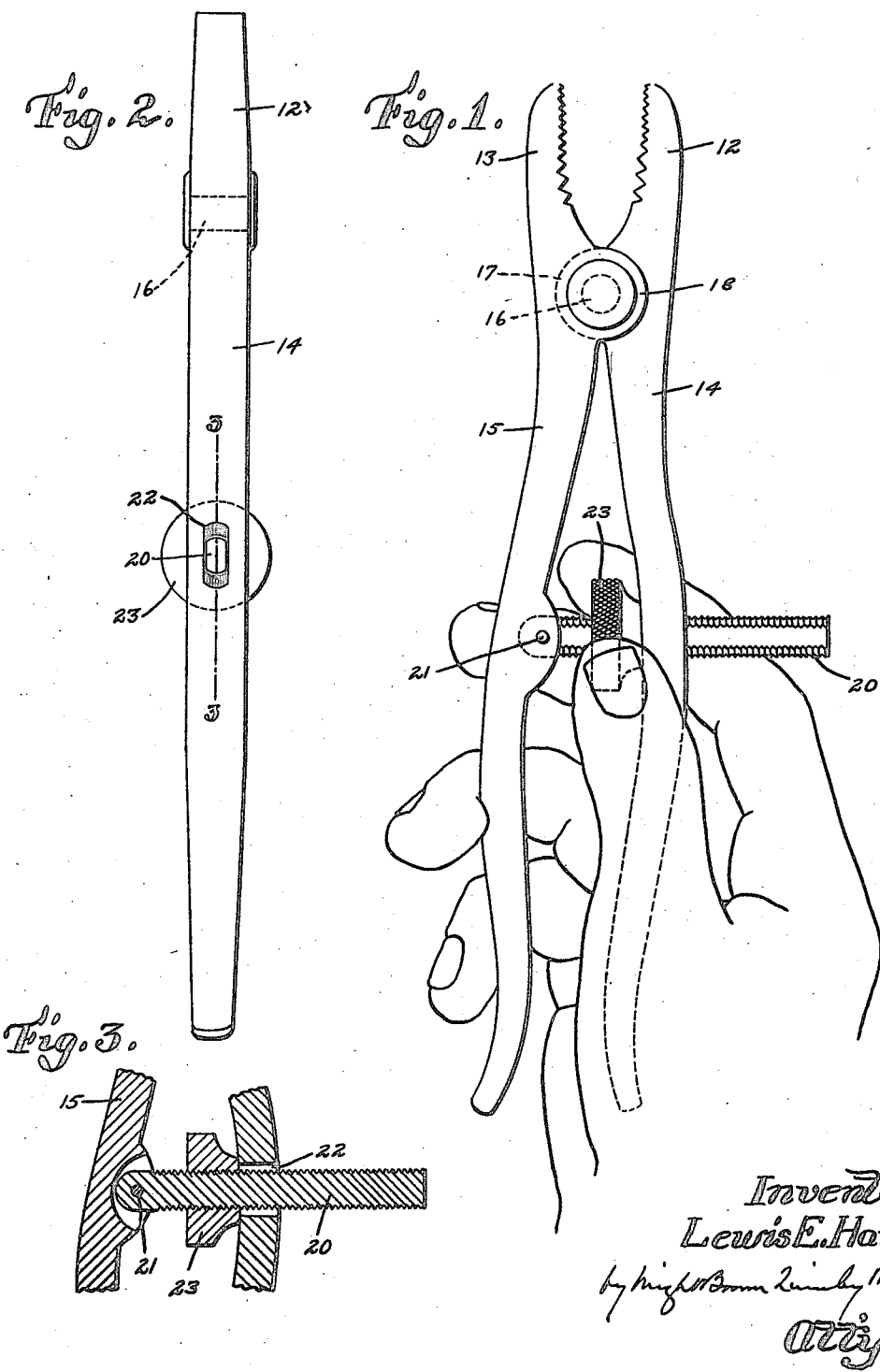
Inventor
Lewis E. Hart
by [signature]
attys.

Patented June 12, 1923.

1,458,292

UNITED STATES PATENT OFFICE.

LEWIS E. HART, OF NEEDHAM, MASSACHUSETTS.

LOCKING PLIERS.

Application filed August 25, 1922. Serial No. 584,270.

*To all whom it may concern:*

Be it known that I, LEWIS E. HART, a citizen of the United States, residing at Needham, in the county of Norfolk and State of Massachusetts, have invented new and useful Improvements in Locking Pliers, of which the following is a specification.

This invention relates to pliers composed of a pair of elongated members and a pivot connecting the same, each member including a jaw at one side of the pivot, and an elongated handle at the opposite side, the arrangement being such that pressure exerted on the handles by the contraction of the hand holding the same, moves the handles toward each other, and opens the jaws.

The object is to provide a tool thus characterized with means whereby the user holding the tool in one hand, may open the jaws to any extent desired by a contraction of the hand, and then, without removing the hand, and by the use of the thumb and a finger thereof, may move the jaws into gripping engagement with an object such as a nut, interposed between the jaws.

I attain this object by the improved construction hereinafter described and claimed.

Of the accompanying drawings forming a part of this specification,—

Figure 1 is a side view, showing pliers embodying the invention, grasped by a hand.

Figure 2 is an edge view of the pliers.

Figure 3 is a fragmentary section on line 3—3 of Figure 2.

The same reference characters indicate the same parts in all of the figures.

In the drawings, 12 and 13 represent the jaws of a pair of pliers, the same having their opposed surfaces suitably serrated to grasp a nut, or other object, interposed between the jaws. The jaw 12 is formed integral with a handle 14, and the jaw 13 is formed integral with a handle 15, each jaw and its handle constituting one of a pair of elongated members which are connected by a pivot bolt 16, engaged in any suitable manner with overlapping ears 17 and 18, formed on said members, the jaws being arranged at one side, and the handles at the opposite side, of the pivot.

The outer end portions of the handles are formed and arranged to constitute rests on which jaw-opening pressure may be exerted, by the contraction of a hand holding the pliers, as shown by Figure 1.

The construction thus far described is common and well known. The usual practice is to exert jaw-closing pressure on the handles by grasping the handles by the two hands of the operator and forcing them apart.

In carrying out my invention I provide a brace or strut, whereby the operator, while holding the handles by one hand, and after opening the jaws and applying the same to a nut or other object, may exert jaw-closing pressure on the handles by the use of the same hand, without removing the hand from the handles. Said brace is composed of a screw-threaded rod 20, pivoted at 21 to the handle 15, and passing loosely through a slot 22, in the handle 14, and a nut 23 engaged with the rod between the handles, and adapted to bear on the inner side of the slotted handle 14. The nut is provided with a peripheral portion, preferably circular, of greater diameter than the width of the handles, so that the nut projects at opposite sides of the tool, as shown by Figure 2. The brace is located between the hand rest portions of the handles, and the pivot 16, the arrangement being such that the nut may be grasped by the thumb and forefinger of the hand holding the tool, as shown by Figure 1, so that while the hand is contracted on the handles, the nut may be turned.

In operating the described pliers the operator adjusts the nut inward, to permit a sufficient opening or separation of the jaws, then applies the jaws to the object to be gripped, and then adjusts the nut outward to close the jaws upon the object and set up a firm connection between the latter and the jaws, which connection is maintained until the nut is turned inward to permit the jaws to release their hold on the object.

The entire operation above described is performed by one hand, and this hand controls the jaws and the gripped object, leaving the other hand free.

The rod 20 is preferably flattened at opposite sides, as shown by Figures 1 and 2, the flat sides interrupting the continuity of the screw thread.

I claim:

Locking pliers comprising a pair of elongated pivotally connected members; a pivot connecting the same, each member including a jaw at one side, and a handle at the opposite side of the pivot, the outer end portions of the handles constituting rests on which jaw-opening pressure may be exerted by a hand holding the pliers; and an adjustable brace composed of a screw-threaded rod pivoted to one handle and passing loosely through a slot in the other handle, and a nut engaged with the rod between the handles, and adapted to bear on the inner side of the slotted handle, said nut having a peripheral grip portion of greater diameter than the width of the handles, the said brace being located between the rest portions of the handles and the pivot, so that the nut may be turned by the thumb and a finger of the hand holding the pliers.

In testimony whereof I have affixed my signature.

LEWIS E. HART.